(12) United States Patent
Guerin et al.

(10) Patent No.: US 10,919,534 B2
(45) Date of Patent: *Feb. 16, 2021

(54) SLIP CONTROL METHOD AND ARRANGEMENT FOR A DRIVELINE

(71) Applicant: TRANSMISSION CVTCORP INC., Sainte-Julie (CA)

(72) Inventors: Jonathan Guerin, Sainte-Julie (CA); Jean-Francois Dionne, LaPrairie (CA)

(73) Assignee: TRANSMISSION CVTCORP INC., Sainte-Julie (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/471,374

(22) PCT Filed: Dec. 19, 2017

(86) PCT No.: PCT/CA2017/051541
§ 371 (c)(1),
(2) Date: Jun. 19, 2019

(87) PCT Pub. No.: WO2018/112620
PCT Pub. Date: Jun. 28, 2018

(65) Prior Publication Data
US 2020/0094834 A1 Mar. 26, 2020

Related U.S. Application Data

(60) Provisional application No. 62/436,473, filed on Dec. 20, 2016.

(51) Int. Cl.
*B60W 30/18* (2012.01)
*B60W 30/188* (2012.01)
(Continued)

(52) U.S. Cl.
CPC ........ *B60W 30/1884* (2013.01); *B60W 10/02* (2013.01); *B60W 10/101* (2013.01); *F16D 7/00* (2013.01); *F16D 48/066* (2013.01); *B60W 2510/0241* (2013.01); *B60W 2510/0283* (2013.01); *B60W 2510/0638* (2013.01); *B60W 2510/0657* (2013.01); *B60W 2710/025* (2013.01); *B60W 2710/027* (2013.01); *B60W 2710/1005* (2013.01);
(Continued)

(58) Field of Classification Search
None
See application file for complete search history.

(56) References Cited

U.S. PATENT DOCUMENTS 4,598,611 A 7/1986 Frank
4,688,665 A * 8/1987 Rowen .................. F16D 43/284
137/56

(Continued)

FOREIGN PATENT DOCUMENTS

EP 0845616 3/1998
WO 2005/037643 4/2005

*Primary Examiner* — Dirk Wright
(74) *Attorney, Agent, or Firm* — Fay Kaplun & Marcin, LLP (57) ABSTRACT

A slip control method and arrangement for a driveline is described herein. The driveline includes a clutch that is so controlled as to slip when a torque higher than the usable torque attempts to pass through. Accordingly, the clutch prevents the prime mover from stalling.

20 Claims, 6 Drawing Sheets

(51) Int. Cl.
*B60W 10/02* (2006.01)
*B60W 10/101* (2012.01)
*F16D 7/00* (2006.01)
*F16D 48/06* (2006.01)

(52) U.S. Cl.
CPC ........... *F16D 2500/30406* (2013.01); *F16D 2500/30415* (2013.01); *F16D 2500/30421* (2013.01); *F16D 2500/30426* (2013.01)

(56) References Cited

U.S. PATENT DOCUMENTS

| | | | | |
|---|---|---|---|---|
| 5,630,773 | A * | 5/1997 | Slicker | B60P 7/0807 |
| | | | | 477/176 |
| 6,641,505 | B2 * | 11/2003 | Sayman | F16D 48/06 |
| | | | | 477/177 |
| 6,790,159 | B1 * | 9/2004 | Buchanan | F16D 48/06 |
| | | | | 477/174 |
| 7,972,240 | B2 * | 7/2011 | Janasek | B60W 30/18172 |
| | | | | 477/39 |
| 7,975,791 | B2 * | 7/2011 | Nozaki | B60K 6/48 |
| | | | | 180/65.6 |
| 8,386,107 | B2 * | 2/2013 | Shimanaka | B60W 10/08 |
| | | | | 701/22 |
| 8,562,464 | B2 | 10/2013 | Yang | |
| 9,243,706 | B2 * | 1/2016 | Fujii | F16H 59/02 |
| 10,167,909 | B2 * | 1/2019 | Choi | F16D 48/06 |
| 10,308,255 | B2 * | 6/2019 | Dionne | B60W 10/101 |
| 10,458,544 | B2 * | 10/2019 | Girard | B60K 23/00 |
| 2015/0126316 | A1 | 5/2015 | Tay | |
| 2016/0332629 | A1 | 11/2016 | Dionne et al. | |
| 2017/0204919 | A1 * | 7/2017 | Okubo | F16D 48/06 |
| 2019/0203782 | A1 * | 7/2019 | Ryuzaki | F16D 48/06 |

* cited by examiner

SLIP CONTROL METHOD AND ARRANGEMENT FOR A DRIVELINE

FIELD

The present disclosure generally relates to drivelines. More specifically, the present disclosure is concerned with a slip control method and arrangement for a driveline.

BACKGROUND

Drivelines are diverse. Some vehicular applications conventionally require a driveline to include a so-called torque converter between the prime mover and the wheels to prevent the prime mover from stalling when the wheels are prevented from rotating while powered.

There is therefore a need to provide a slip control method and arrangement for a driveling in view of preventing the prime mover from stalling without requiring a torque converter.

BRIEF DESCRIPTION OF THE DRAWINGS

In the appended drawings:

FIG. 3 is a graph illustrating the torque vs. RPM of a prime mover and the torque allowed to pass through a clutch vs. this same RPM.

DETAILED DESCRIPTION

An object is generally to provide a slip control method and arrangement for a driveline. More specifically, an object is to provide a slip control method and arrangement used in a driveline to reduce the risks of the prime mover stalling.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The expression "connected" should be construed herein and in the appended claims broadly so as to include any cooperative or passive association between mechanical parts or components. For example, such parts may be assembled together by direct connection, or indirectly connected using further parts therebetween. The connection can also be remote, using for example a magnetic field or else.

The term "about" is used to indicate that a value includes an inherent variation of error for the device or the method being employed to determine the value.

It is to be noted that the expression "prime mover" is to be construed herein and in the appended claims as an internal combustion engine (ICE), a turbine engine, or any other mechanical power production element or assembly.

It is to be noted that the term "CVT", standing for Continuously Variable Transmission, is used herein to describe any type of CVT including, amongst others, a toroidal CVT, a dual-cavity full toroidal CVT, a half-toroidal CVT, a single cavity toroidal CVT, a hydrostatic CVT, a Variable diameter pulley CVT, a magnetic CVT, a ratcheting CVT and a cone CVT. It is also to be noted that the term "CVT" is also to be construed, herein and in the appended claims, as a CVT provided with further elements allowing it to operate as an IVT, standing for Infinitely Variable Transmission, a subset of CVT designs in which the range of ratios of output shaft speed to input shaft speed includes a zero ratio.

It is to be noted that the expression "overdrive" when used in the context of a CVT, is to be construed herein and in the appended claims as a condition where the CVT ratio is such that the CVT output speed is higher than the CVT input speed. The CVT ratio (of output speed to input speed) is therefore higher that one to one (1:1).

It is to be noted that the expression "underdrive" when used in the context of a CVT, is to be construed herein and in the appended claims as a condition where the CVT ratio is such that the CVT output speed is lower than the CVT input speed. The CVT ratio (of output speed to input speed) is therefore lower that one to one (1:1).

It is to be noted that the expression "off-highway vehicle" is to be construed herein and in the appended claims as any type of vehicle that is designed specifically for use off-highway, including, amongst others, construction vehicles and agricultural vehicles.

Other objects, advantages and features of the slip control method and arrangement for a driveline will become more apparent upon reading of the following non-restrictive description of illustrative embodiments thereof, given by way of example only with reference to the accompanying drawings.

Figure 1:
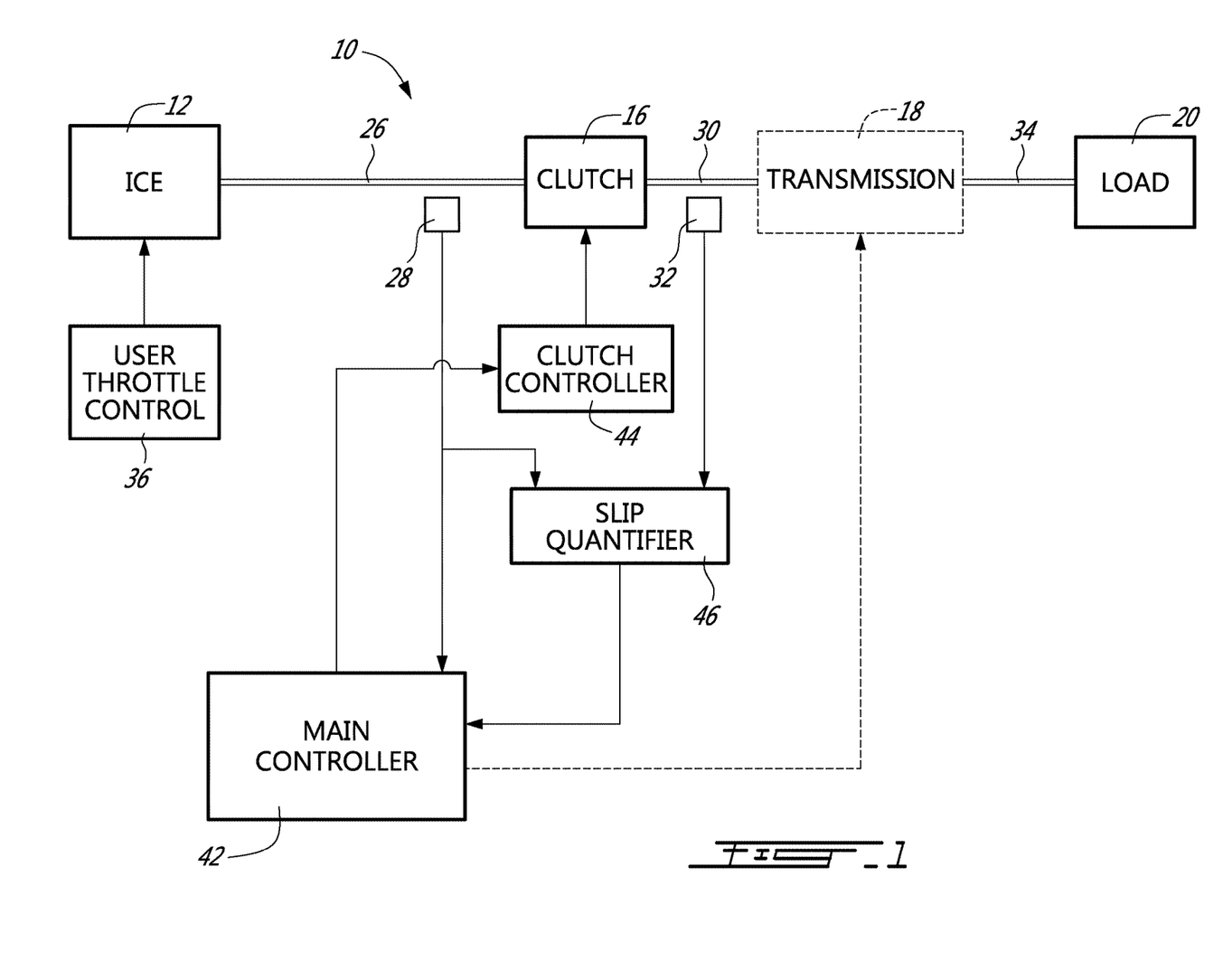
FIG. 1 is a block diagram of a driveline including a slip control arrangement according to a first illustrative embodiment.

FIG. 1 of the appended drawings illustrate a driveline 10 comprising a prime mover in the form of an ICE 12, a clutch 16 and an optional transmission 18. The output of the optional transmission 18 is connected to a load 20, as a non-limiting example, the wheels of an off-highway vehicle. Of course, should the optional transmission 18 be absent from the design, the output of the clutch 16 would be connected to the load 20.

A first shaft 26 interconnects the output of the ICE 12 and the input of the clutch 16; the speed of the first shaft 26 is measured via a first speed sensor 28. A second shaft 30 interconnects the output of the clutch 16 and the input of the optional transmission 18; the speed of the second shaft 30 is measured via a second speed sensor 32. Finally, a third shaft 34 interconnects the output of the optional transmission 18 and the load 20.

One skilled in the art will understand that should the driveline 10 be installed in a four-wheel drive vehicle, two third shafts 34 would be used.

Of course, as mentioned hereinabove, one skilled in the art will understand that should the optional transmission 18 be absent, the shaft 34 would not be present and the shaft 30 would interconnect the output of the clutch 16 and the load 20.

Conventionally, the ICE 12 includes an integrated controller (not shown) that is associated with a user throttle control 36, for example an acceleration pedal (also not shown).

The driveline 10 also includes a clutch controller 44 that is so configured as to take a usable torque value and to control the clutch 16 so as to slip when the torque attempting to pass through the clutch 16 is greater than this usable torque value. In other words, when the torque between the input and output of the clutch 16 is greater than the usable torque value supplied, the clutch 16 slips.

One skilled in the art will have no problem building such a clutch controller adapted to the technology used in the clutch 16.

The driveline 10 also includes a main controller 42.

The speed data of the first and second speed sensors 24 and 32 is supplied to a slip quantifier 46 that determines if slippage of the clutch 16 occurs and if so, what is the slippage level, in real time, and supply this data to the main controller 42. In other words, the slip quantifier 46 compares the speeds of the input and output shafts of the clutch to determine slippage and slippage level.

The main controller 42 receives data from the slip quantifier 46 and controls the clutch controller 44.

Of course, one skilled in the art will understand that the user throttle control 36 could be connected to the main controller 42 that would be, in turn, connected to the ICE 12.

As shown in FIG. 1, the transmission 18 and its connection to the main controller 42 are optional and shown schematically. This transmission 18 is there to represent, for example, a conventional multi ratio arrangement that allows different gear ratios to be interposed between the clutch 16 and the load. Since the configurations and the operation of such a transmission are believed known to those skilled in the art, they will not be further described herein.

One skilled in the art will also understand that the optional transmission 18 could alternatively be positioned between the ICE 12 and the clutch 16.

Figure 2:
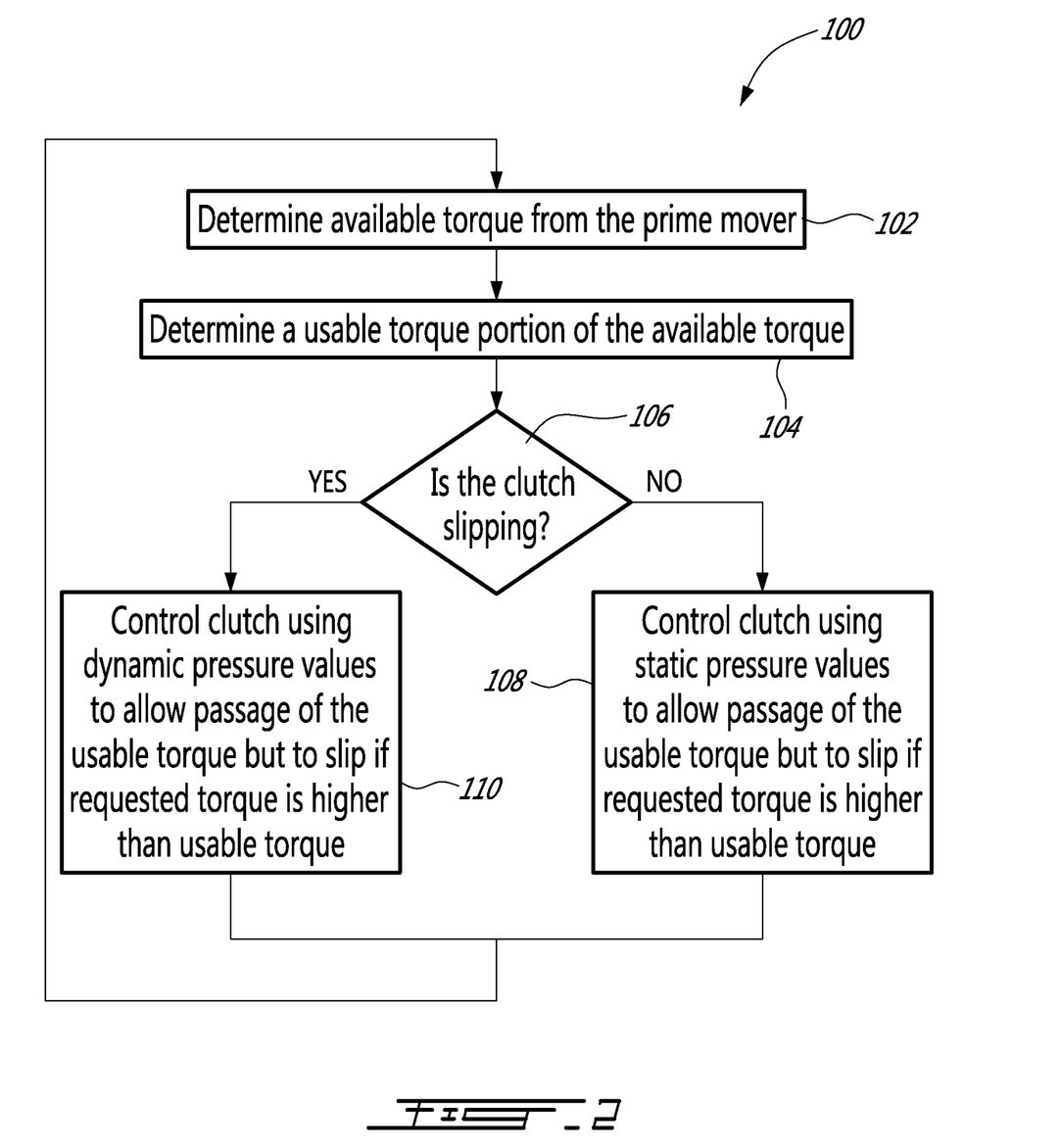
FIG. 2 is a block diagram of a method to control the slip of a clutch of the driveline of FIG. 1.

Turning now to FIG. 2 of the appended drawings, a slip control method 100, according to a first illustrative embodiment, for a driveline such as 10 will be described.

The first step 102 of the method 100 consists of determining the available torque from the prime mover. Depending on the features of the elements on the driveline 10, there are many ways that the available torque can be known. As a first example, with reference to FIG. 1, the prime mover, in the form of the ICE 12 includes an internal controller (not shown) that knows the available torque at all time and can supply this data to the main controller 42 via a connection between the ICE 12 and the main controller 42 (not shown). As a second example, the controller 42 may be provided with a map of available torque depending on the RPM of the output shaft of the ICE 12. This map may be built by the driveline manufacturer and stored in the controller 42. Since the controller 42 receives the speed data of the shaft from the first speed sensor 24, it can look up the available torque in real time.

FIG. 3 of the appended drawings is a graph illustrating the available torque vs. the prime mover RPM for a particular ICE.

Returning to FIG. 2, from the available torque, the controller 42 determines a usable torque in step 104. The usable torque is generally lower than the available torque to provide a safety margin to prevent the ICE 12 from stalling.

Again, FIG. 3 illustrates the usable torque vs. RPM for a particular ICE. It is to be noted that the usable torque does not follow the available torque at low RPMs. The reason therefor will be explained hereinbelow. One skilled in the art will understand that the usable torque graph of FIG. 3 is an example of a possible usable torque with respect to an available torque. Indeed, in some applications the safety margin between the available torque and the usable torque can be much less than illustrated in FIG. 3 and the general shape of the usable torque graph can be different than shown in FIG. 3.

It is to be noted that the usable torque values can be stored in a look-up table provided in the main controller 42, for example. Accordingly, the controller 42 may quickly determine the usable torque from the speed of the output shaft of the ICE 12.

Step 106 in the method 100 illustrated in FIG. 2 involves the determination of the slippage condition of the clutch 16. This is done by the slip quantifier 46 and the slippage data is supplied to the main controller 42. If the main controller 42 determines, that there is no slippage, the method branches to step 108, if there is slippage, the method branches to step 110.

Figure 4:
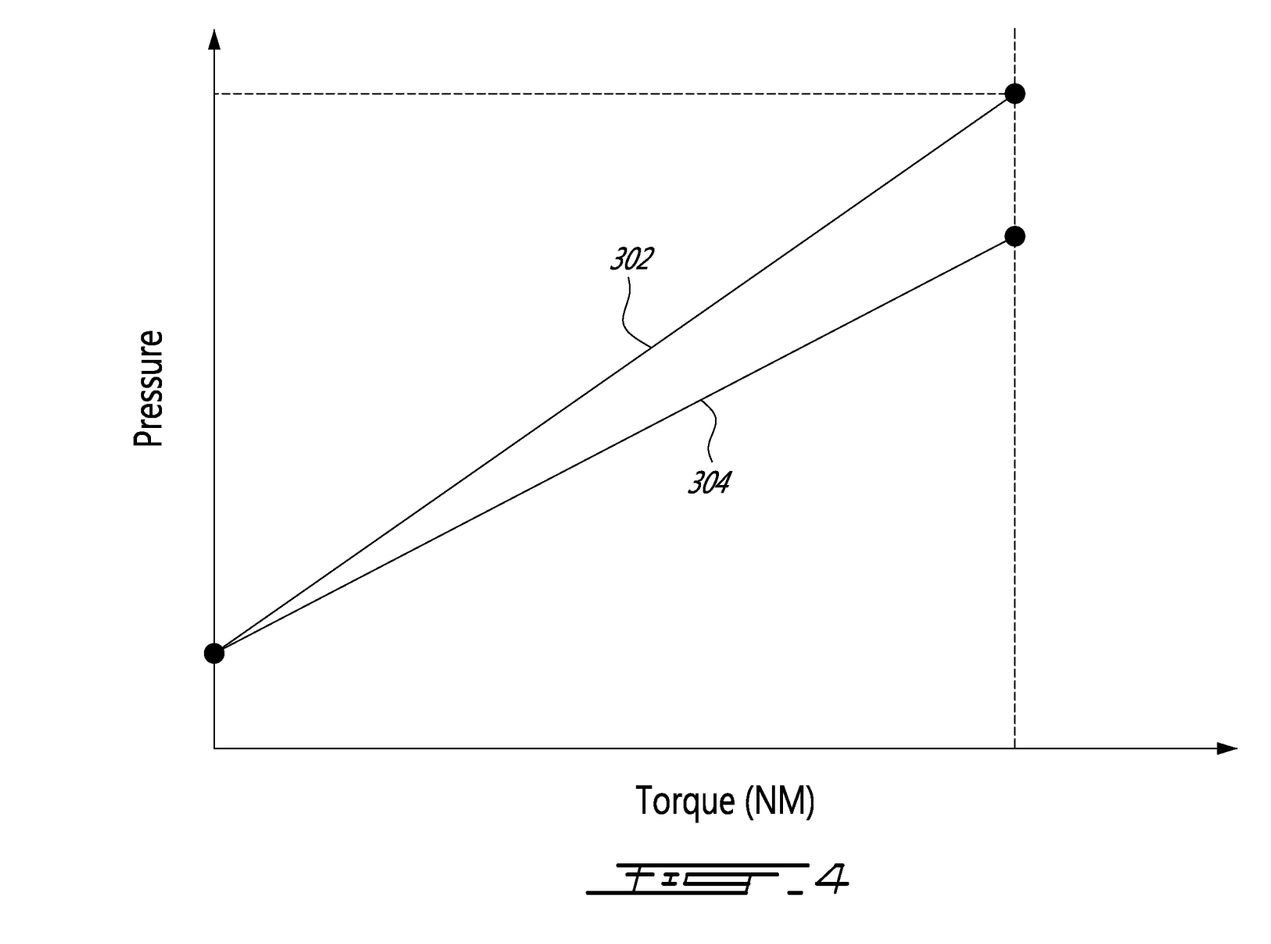
FIG. 4 is a schematic graph illustrating the clutch pressure vs. the torque limit before slipping for a clutch that is stable and for a clutch that is slipping.

FIG. 4 is a graph schematically illustrating the pressure level required in the clutch with respect to the torque level required to pass. Curve 302 illustrates the pressure required when the clutch is already slipping (dynamic state) while curve 304 illustrates the pressure required when the clutch is not currently slipping (static state).

Indeed, one skilled in the art of clutches will understand that when the clutch is not slipping, less pressure is required for a given level of torque to pass through before the clutch starts to slip. Conversely, for the clutch to allow the same level of torque to pass through if the clutch is currently slipping, more pressure is required. Accordingly, in step 108, the static pressure curve 304 is used to determine the pressure value needed to enable the clutch to pass the usable torque but to slip if more torque is requested.

Similarly, in step 110, the dynamic pressure curve 302 is used to determine the pressure value needed to enable the clutch to pass the usable torque but to slip if more torque is requested.

Accordingly, in steps 108 or 110, the controller 42 supplies the adequate pressure value to the clutch controller 44 that controls the clutch 16 so that slippage of the clutch 16 occurs if a torque greater than the instantaneous usable torque attempts to pass therethrough. Accordingly, should a block load be applied, for example by preventing wheels of the off-highway vehicle from turning, the torque requested by the wheels and therefore attempting to pass through the clutch 16 increases drastically and quickly exceeds the usable torque. When this occurs, the clutch 16 slips, preventing the ICE from stalling and protecting the various components of the driveline 10. Indeed, as is well known to those skilled in the art, should the output shaft of the ICE be prevented from rotating while the ICE is operating, the ICE would stall. Slippage of the clutch 16 above a torque level higher than the instantaneous usable torque therefore ensures that the output shaft of the ICE is not prevented from rotating.

The method then loops back to step 102.

One skilled in the art will understand that other actions could be taken if the clutch slips. For example, the controller could disengage the clutch completely should the clutch temperature rise above a threshold.

Returning to FIG. 3, the usable torque curve may be separated in three zones. A low RPM zone 202, a medium RPM zone 204 and a high RPM zone 206. In the low RPM zone 202, the usable torque is set significantly lower than the available torque. Accordingly, the slippage of the clutch 16 will be more pronounced at these speeds. In this zone, the usable torque is set low enough as to either prevent rotation of the output or allow "creeping" of the output given a small load depending on the desired driving sensation.

In the medium RPM zone 204, the usable torque linearly increases with the RPM but is still significantly lower than the available torque from the prime mover. The clutch slippage setpoint will therefore increase with increasing RPM. Accordingly, should a small block load prevent rotation of the wheels, an increase in RPM (while in the zone 204) may cause the wheels to rotate. This has been found to give better driving sensations to the operator. Of course, the linearity of the medium RPM zone is not required, and other functions could be used.

Finally, in the high RPM zone 206, the usable torque generally follows the available torque with a safety margin.

One skilled in the art will understand that the usable torque curve could be designed differently depending on the specific application. It is believed that one skilled in the art will be in a position to design an adequate usable torque curve and store it in the main controller 42.

Of course, a clutch pedal or other user control could be used to disengage the clutch 16 manually by the operator.

As will be easily understood by one skilled in the art, the main controller 42 could integrate the clutch controller 44 and the slip quantifier 46.

Even though curves have been used herein to distinguish between static and dynamic pressure values, one skilled in the art will understand that the controller 42 may include tables or mathematical functions to determine the instantaneous value to use.

Figure 5:
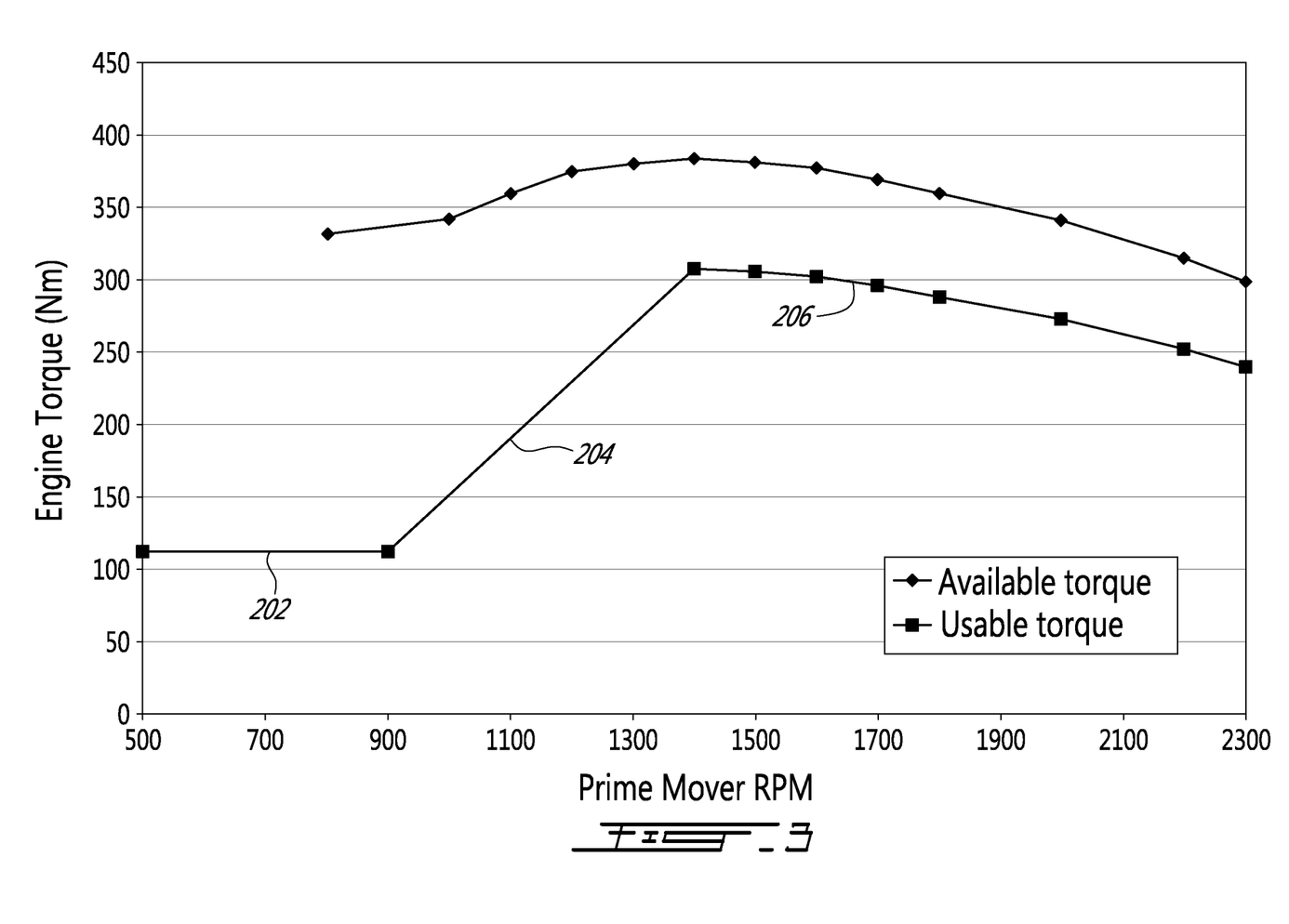
FIG. 5 is a block diagram of a driveline including a CVT and a slip control arrangement according to a second illustrative embodiment.
Figure 6:
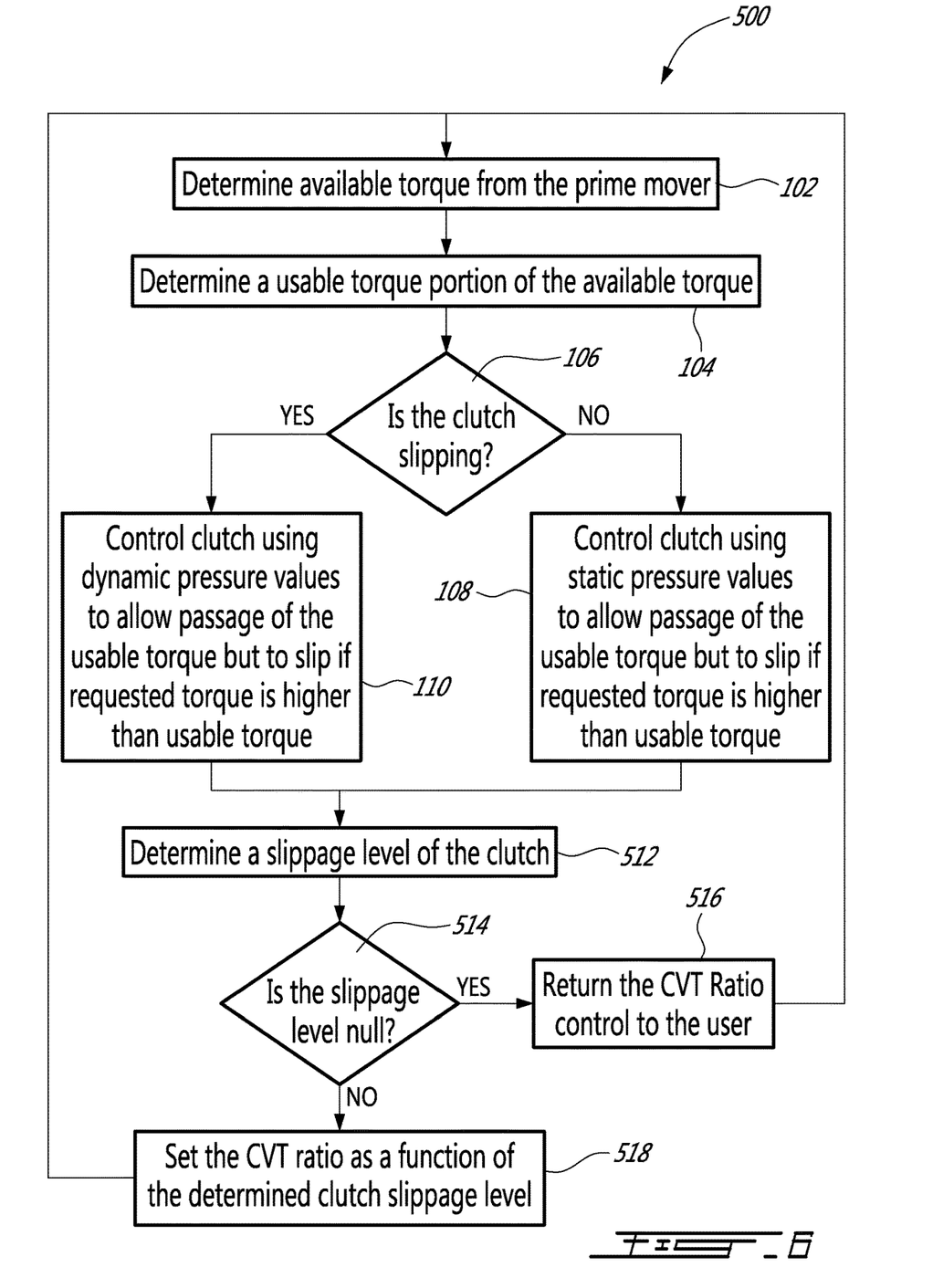
FIG. 6 is a block diagram of a method to control the slip of a clutch when a driveline similar to the driveline of FIG. 5 is used.

Turning now to FIGS. 5 and 6 of the appended drawings, a driveline 400 and corresponding method 500 according to a second illustrative embodiment will be described. The driveline 400 shares many elements with the driveline 10. These elements keep the same reference numeral.

The main difference between the driveline 10 and the driveline 400 consists in the addition of a Continuously Variable Transmission (CVT) 402 provided between the ICE 12 and the clutch 16. More specifically, the output of the CVT 402 is connected to the input of the clutch 16 via the shaft 26 while the ICE 12 is connected to the input of the CVT 402 via a supplemental shaft 404. A supplemental speed sensor 412 is associated with the shaft 404 and supplies speed data to the main controller 410.

The driveline 400 includes a ratio controller 406 so configured as to set the ratio of the CVT 402 according to either a ratio provided by the user via a user ratio control 408 or according to a ratio provided by a main controller 410 as will be described hereinbelow. It will be understood from the foregoing description that the ratio supplied by the main controller 410 has precedence over the user ratio control 408. Accordingly, the main controller 410 may take over and dictate the ratio of the CVT 402.

It is also to be noted that the speed data from the sensors 28 and 412 are supplied to the ratio controller 406 via the main controller 410 for example to enable this controller to finely control the ratio of the CVT 402. The main controller 42, using the speed data from the speed sensors 28 and 412 may determine the actual ratio of the CVT 402 in real time.

The driveline 400 also optionally includes a synchro 418, which represents, for example, a conventional multi ratio arrangement that allows different gear ratios to be interposed between the clutch 16 and the load. Since the configurations and the operation of such a transmission are believed known to those skilled in the art, they will not be further described herein.

Turning now to FIG. 6 of the appended drawings, a method 500, similar to the method 100 of FIG. 2 but including supplemental steps to take advantage of the presence of the CVT 402 in the driveline 400, will be described.

More specifically, the methods 100 and 500 share the steps 102 to 110.

Returning to FIG. 3 of the appended drawings, it is to be noted that the usable torque illustrated in FIG. 3 is the usable torque at the output of the ICE 12. The use of a CVT 402 downstream of the ICE 12 allows this usable torque to be modified by the CVT 402. Indeed, the torque is multiplied as a function of the ratio of the CVT. The controller therefore uses its knowledge of the instantaneous ratio of the CVT 402 to determine a usable torque at the input of the clutch 16 and this value is used in the next steps. In other words, the usable torque graph of FIG. 3 is vertically offset as a function of the CVT ratio by the controller 410.

Accordingly, since the driveline 400 includes a CVT that can inherently modify the speed ratio and therefore the available torque at the input of the clutch 16, supplemental steps are added to the method 500 to improve the usability of the driveline 400.

Step 512 involves the determination of the slippage level of the clutch 16. This is done by the slip quantifier 46 and the slippage data is supplied to the main controller 410.

The controller 410, in step 514, branches to step 518 if the clutch slippage is non-null. In other words, if there is slippage in the clutch 16, step 518 is performed.

In step 518, the controller 410 takes over the ratio controller 406 and dictates the ratio of the CVT 402. In the illustrated embodiment, the main controller 410 is so configured that the ratio of the CVT is decreased in proportion of the slippage of the clutch 16. Indeed, since the usable torque generally increases as the CVT ratio decreases, the slippage setpoint of the clutch 16 is thereby automatically modified by the controller 410 and slippage may stabilize, decrease and/or stop.

One possible way of controlling the driveline 400 is to control the clutch slippage so as to stabilize it. This is done by gradually changing the CVT ratio until the clutch slippage remains substantially constant.

One skilled in the art could design other manners to control the CVT ratio in relation to the slippage level of the clutch so as to stabilize it, decrease it and/or stop it.

Step 518 loops back to step 102.

Should no slippage be detected in step 514, then step 516 is performed. In this step, the control of the CVT ratio is gradually returned back to the user since the usable torque is sufficient to drive the load 20. This is done gradually so as to prevent sudden change in driving behavior, which is detrimental to the user driving sensations. Of course, step 516 is not performed if the CVT ratio control is already in the hands of the user.

This step 516 returns to step 102 to loop the method 500.

As will be easily understood by one skilled in the art, the main controller 410 could integrate the ratio controller 406, the clutch controller 44 and/or the slip quantifier 46.

One skilled in the art will understand that while the appended drawings and the above description teaches that the available torque from the prime mover is determined using the rotational speed of the output shaft 22 or 404 via the sensor 28 or 412, some prime mover may be directly connected to the controller 42 or 410 and supply this data directly.

One skilled in the art will understand that the user ratio control 408 could be omitted and that the main controller 410 could be configured to control the ratio of the CVT 402 at all time.

It is to be noted that with different material used in the making of the clutch 16 and/or different oils provided in the clutch 16, the curves showing the different pressures required to pass different torques when the clutch is slipping or non-slipping could be different than the ones in FIG. 4. In some cases, the curves 302 and 304 could be reverse, i.e. that more pressure would be required to pass a given torque should the clutch be in a static state.

As an example of application of the driveline 400, the operation of a loader tractor will be briefly described. Such a vehicle often has to push against obstacles, for example when its bucket is being filled. When this is the case, the ICE must be prevented from stalling. By providing a driveline as proposed herein, the ICE stalling would be prevented by the selective slipping of the clutch and the torque supplied to the wheels would be increased by the control of the CVT ratio. All that without special intervention of the operator other than actuating the throttle control according to the desired speed of the vehicle.

It is to be understood that the slip control method and arrangement for a driveline including a continuously variable transmission is not limited in its application to the details of construction and parts illustrated in the accompanying drawings and described hereinabove. The slip control method and arrangement for a driveline including a continuously variable transmission is capable of other embodiments and of being practiced in various ways. It is also to be understood that the phraseology or terminology used herein is for the purpose of description and not limitation. Hence, although the slip control method and arrangement for a driveline including a continuously variable transmission has been described hereinabove by way of illustrative embodiments thereof, it can be modified, without departing from the spirit, scope and nature thereof.

The following clauses are offered as further description:

1. A method to control the slippage of a driveline including a prime mover having an output shaft, a clutch having an input connected to the output shaft of the prime mover and an output connectable to a load; the clutch having a controllable slippage level between its input and output via a controllable pressure applied thereonto, the slippage control method including:

determining a usable torque of the prime mover;

determining a slippage condition of the clutch and controlling the pressure applied to the clutch according to the determined slippage condition of the clutch so as to allow the usable torque to pass therethrough and to cause the clutch to slip should a torque between the input and output of the clutch be greater than the usable torque.

2. The slippage control method of clause 1, wherein the usable torque determining includes determining an available torque of the prime mover and calculating a usable torque as a function of an instantaneous speed of the output shaft of the prime mover and of the available torque.

3. The slippage control method of clause 2 wherein the available torque is determined according to the instantaneous speed of the output shaft of the prime mover.

4. The slippage control method of any of the previous clauses, wherein the driveline further includes a CVT having a variable ratio provided between the prime mover and the clutch, the method further comprising:

determining a slippage level of the clutch; and setting a ratio of the CVT as a function of the slippage level of the clutch so as to increase the usable torque.

5. The slippage control method of clause 4, wherein determining the slippage level of the clutch includes comparing a speed of the input of the clutch and a speed of the output of the clutch.

6. The slippage control method of any of the previous clauses, wherein determining the slippage condition of the clutch includes comparing a speed of the input of the clutch and a speed of the output of the clutch.

7. The slippage control method of any of the previous clauses, wherein the slippage condition is dynamic when the speed of the input and the speed of the output of the clutch are non-equal and static when the speeds are equal; wherein the pressure applied to the clutch to allow the usable torque to pass therethrough is greater when the slippage condition is dynamic than when the slippage condition is static.

8. A driveline including:

a prime mover having an output shaft;

a prime mover speed sensor measuring the rotational speed of the output shaft;

a clutch having an input associated with the output shaft of the prime mover and an output;

a clutch slip quantifier so configured as to detect the slippage condition of the clutch;

a clutch controller controlling the level of torque allowed to pass through the clutch before slippage occurs therein; and a main controller associated with the prime mover speed sensor and with the clutch controller; the main controller being so configured as to determine a usable torque of the prime mover and to set the clutch controller as a function of the slippage condition of the clutch so that the clutch slips when a torque higher than the usable torque attempts to pass through the clutch.

9. The driveline recited in clause 8, wherein the usable torque is determined as a function of the rotational speed of the output shaft of the prime mover.

10. The driveline recited in any of clauses 8 to 9, wherein the usable torque is determined from an available torque received from the prime mover and a speed of the output shaft of the prime mover.

11. The driveline recited in any of clauses 8 to 10, wherein the clutch slip quantifier includes an input speed sensor measuring the speed of the clutch input and an output speed sensor measuring the speed of the clutch output.

12. The driveline recited in any of clauses 8 to 11, further comprising a user control to manually disengage the clutch.

13. The driveline recited in any of clauses 8 to 12, wherein the clutch controller and the clutch slip quantifier are integrated with the main controller.

14. The driveline recited in any of clauses 8 to 13, where the driveline is integrated in an off-highway vehicle.

15. A driveline including:

a prime mover having an output shaft;

a CVT having an input associated with the output shaft of the prime mover and an output; the CVT having a variable ratio;

a clutch having an input associated with the output of the CVT and an output;

a clutch slip quantifier so configured as to detect the slippage condition of the clutch;

a clutch controller controlling the level of torque allowed to pass through the clutch before slippage occurs therein; and a main controller associated with the prime mover and with the clutch controller; the main controller being so configured as to determine a usable torque of the prime mover and to set the clutch controller as a function of the slippage condition of the clutch so that the clutch slips when a torque higher than the usable torque attempts to pass through the clutch.

16. The driveline recited in clause 15, wherein the usable torque is determined as a function of the rotational speed of the output shaft of the prime mover.

17. The driveline recited in any of clauses 15 to 16, wherein the usable torque is determined from an available torque received from the prime mover and a speed of the output shaft of the prime mover.

18. The driveline recited in any of clauses 15 to 17, further comprising a ratio controller setting the ratio of the CVT; wherein the ratio controller decreases the CVT ratio when slippage is detected.

19. The driveline recited in clause 18, wherein the ratio controller decreases the CVT ratio as a function of a quantified slippage in the clutch.

20. The driveline recited in any of clauses 15 to 19, wherein the slippage quantifier includes an input speed sensor measuring the speed of the clutch input and an output speed sensor measuring the speed of the clutch output.

21. The driveline recited in any of clauses 15 to 20, further comprising a user control to manually disengage the clutch.

22. The driveline recited in any of clauses 15 to 21, wherein the ratio controller, the clutch controller and the slippage quantifier are integrated with the main controller.

23. The driveline recited in any of clauses 15 to 22, where the driveline is integrated in an off-highway vehicle.

What is claimed is:

1. A method to control the slippage of a driveline including a prime mover having an output shaft, a clutch having an input connected to the output shaft of the prime mover and an output connectable to a load; the clutch having a controllable slippage level between its input and output via a controllable pressure applied thereonto, the slippage control method including:
    determining a usable torque of the prime mover;
    determining a slippage condition of the clutch and
    controlling the pressure applied to the clutch according to the determined slippage condition of the clutch so as to allow the usable torque to pass therethrough and to cause the clutch to slip should a torque between the input and output of the clutch be greater than the usable torque.

2. The slippage control method of claim 1, wherein the usable torque determining includes determining an available torque of the prime mover and calculating a usable torque as a function of an instantaneous speed of the output shaft of the prime mover and of the available torque.

3. The slippage control method of claim 2 wherein the available torque is determined according to the instantaneous speed of the output shaft of the prime mover.

4. The slippage control method of claim 1, wherein the driveline further includes a CVT having a variable ratio provided between the prime mover and the clutch, the method further comprising:
    determining a slippage level of the clutch; and
    setting a ratio of the CVT as a function of the slippage level of the clutch so as to increase the usable torque.

5. The slippage control method of claim 1, wherein determining the slippage condition of the clutch includes comparing a speed of the input of the clutch and a speed of the output of the clutch.

6. The slippage control method of claim 1, wherein the slippage condition is dynamic when the speed of the input and the speed of the output of the clutch are non-equal and static when the speeds are equal; wherein the pressure applied to the clutch to allow the usable torque to pass therethrough is greater when the slippage condition is dynamic than when the slippage condition is static.

7. A driveline including:
    a prime mover having an output shaft;
    a prime mover speed sensor measuring the rotational speed of the output shaft;
    a clutch having an input associated with the output shaft of the prime mover and an output;
    a clutch slip quantifier so configured as to detect the slippage condition of the clutch;
    a clutch controller controlling the level of torque allowed to pass through the clutch before slippage occurs therein; and
    a main controller associated with the prime mover speed sensor and with the clutch controller; the main controller being so configured as to determine a usable torque of the prime mover and to set the clutch controller as a function of the slippage condition of the clutch so that the clutch slips when a torque higher than the usable torque attempts to pass through the clutch.

8. The driveline recited in claim 7, wherein the usable torque is determined as a function of the rotational speed of the output shaft of the prime mover.

9. The driveline recited in claim 7, wherein the usable torque is determined from an available torque received from the prime mover and a speed of the output shaft of the prime mover.

10. The driveline recited in claim 7, wherein the clutch slip quantifier includes an input speed sensor measuring the speed of the clutch input and an output speed sensor measuring the speed of the clutch output.

11. The driveline recited in claim 7, wherein the clutch controller and the clutch slip quantifier are integrated with the main controller.

12. A driveline including:
    a prime mover having an output shaft;
    a CVT having an input associated with the output shaft of the prime mover and an output; the CVT having a variable ratio;
    a clutch having an input associated with the output of the CVT and an output;
    a clutch slip quantifier so configured as to detect the slippage condition of the clutch;
    a clutch controller controlling the level of torque allowed to pass through the clutch before slippage occurs therein; and
    a main controller associated with the prime mover and with the clutch controller; the main controller being so configured as to determine a usable torque of the prime mover and to set the clutch controller as a function of the slippage condition of the clutch so that the clutch slips when a torque higher than the usable torque attempts to pass through the clutch.

13. The driveline recited in claim 12, wherein the usable torque is determined as a function of the rotational speed of the output shaft of the prime mover.

14. The driveline recited in claim 12, wherein the usable torque is determined from an available torque received from the prime mover and a speed of the output shaft of the prime mover.

15. The driveline recited in claim 12, further comprising a ratio controller setting the ratio of the CVT; wherein the ratio controller decreases the CVT ratio when slippage is detected.

16. The driveline recited in claim 15, wherein the ratio controller decreases the CVT ratio as a function of a quantified slippage in the clutch.

17. The driveline recited in claim 12, wherein the slippage quantifier includes an input speed sensor measuring the speed of the clutch input and an output speed sensor measuring the speed of the clutch output.

18. The driveline recited in claim 12, further comprising a user control to manually disengage the clutch.

19. The driveline recited in claim 12, wherein the ratio controller, the clutch controller and the slippage quantifier are integrated with the main controller.

20. The driveline recited in claim 12, where the driveline is integrated in an off-highway vehicle.

* * * * *